(12) United States Patent
Lu et al.

(10) Patent No.: US 12,418,432 B2
(45) Date of Patent: Sep. 16, 2025

(54) PARTICIPANT DATA SYNCHRONIZATION IN VIDEOCONFERENCING

(71) Applicant: Hewlett-Packard Development Company, L.P., Spring, TX (US)

(72) Inventors: Meng-Ju Lu, Hsinchu County (TW); Shih-Wei Lin, New Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/415,112

(22) Filed: Jan. 17, 2024

(65) Prior Publication Data

US 2025/0233765 A1    Jul. 17, 2025

(51) Int. Cl.
*H04L 12/18* (2006.01)
*G10L 15/22* (2006.01)

(52) U.S. Cl.
CPC .......... *H04L 12/1822* (2013.01); *G10L 15/22* (2013.01); *G10L 2015/227* (2013.01)

(58) Field of Classification Search
None
See application file for complete search history.

(56) References Cited

U.S. PATENT DOCUMENTS

| | | | |
|---|---|---|---|
| 10,743,107 B1* | 8/2020 | Yoshioka | H04R 29/006 |
| 2014/0078938 A1* | 3/2014 | Lachapelle | A61B 17/3211 |
| | | | 370/260 |
| 2016/0006986 A1* | 1/2016 | Settipalli | H04N 7/155 |
| | | | 348/14.08 |
| 2017/0236532 A1* | 8/2017 | Reynolds | H04M 3/42221 |
| | | | 704/248 |
| 2020/0092422 A1* | 3/2020 | Dickins | H04M 3/42221 |
| 2020/0106708 A1* | 4/2020 | Sleevi | H04L 65/80 |
| 2020/0349953 A1* | 11/2020 | Qin | G10L 15/26 |
| 2020/0403818 A1* | 12/2020 | Daredia | G10L 17/00 |
| 2021/0174791 A1* | 6/2021 | Shen | G06N 3/04 |
| 2021/0399911 A1* | 12/2021 | Jorasch | H04L 12/1818 |
| 2022/0303502 A1* | 9/2022 | Fisher | H04L 67/104 |
| 2022/0368554 A1* | 11/2022 | Williams | H04L 12/1831 |
| 2023/0063454 A1* | 3/2023 | Delsordo | H04N 5/04 |
| 2024/0406622 A1* | 12/2024 | Fernandez | G10L 25/30 |

* cited by examiner

*Primary Examiner* — Phyllis A Book
(74) *Attorney, Agent, or Firm* — Quarles & Brady LLP (57) ABSTRACT

Systems, methods, and media are provided for processing participant data in a videoconference. The method includes recording an audio signal with a microphone associated with a participant of the conference and determining if the audio signal includes speech produced by the participant using a speech detection module. The method also includes determining if a time delay exists between initiation of the speech and the determination that the audio signal includes the speech produced by the participant. The method further includes adjusting a first speed of the audio signal to an adjusted first speed if the time delay is determined to exist and outputting the audio signal at the adjusted first speed.

19 Claims, 8 Drawing Sheets

PARTICIPANT DATA SYNCHRONIZATION IN VIDEOCONFERENCING

BACKGROUND

Videoconferencing systems typically connect people at a videoconferencing endpoint, such as a videoconference room, with people at other videoconferencing endpoints. During some videoconferences, participants manually mute and un-mute their microphones to prevent unwanted noise from being transmitted to the other endpoints of the videoconference.

DETAILED DESCRIPTION

Videoconferencing systems typically connect people at a videoconferencing endpoint, such as a videoconference room, with people at other videoconferencing endpoints, such as a remote work room. In such systems, audio and visual data of each participant can be recorded by microphones and cameras, respectively, before being transmitted to other videoconferencing endpoints, thereby improving communication and interaction in the videoconference.

When a microphone connected to a videoconference system is used in a public place, a large conference room, or another room with two or more participants, background sounds, side conversations, or other distracting noises may be present in the audio signal that the microphone records and outputs to other participants in the videoconference. For example, a videoconference participant who is working remotely may unintentionally transmit ambient noise, e.g., side conversations, construction noise, animal sounds, to the other videoconferencing endpoints, which can lead to an undesirable videoconferencing experience for the other videoconference participants. In addition, no adequate industry standard or specification has been developed to reduce unwanted visuals, e.g., persons or objects, that enter a field of view (FOV) of a camera connected to the videoconference system from being transmitted to remote endpoints in a videoconferencing system.

More specifically, objects or persons not participating in the videoconference may move into the FOV of a camera used to record visual data for the videoconference system. This may be particularly true when a participant is working remotely in a public space or with others present in the participant's vicinity. As a result, images of non-participants may be transmitted to a far end of the videoconference, which in turn may be confusing to the actual participants in the videoconference. Correspondingly, it is undesirable to transmit a particular view to a far end of the videoconference if a participant's face is not fully visible in that particular view, e.g., if the participant turns to talk to a person that is not in the FOV of the camera or gets up to walk around.

Moreover, existing videoconferencing systems often rely on the participant to manually toggle the mute button of a microphone and the camera power button of a camera to reduce unwanted audio and/or video data from being transmitted to the other endpoints of the videoconference. However, manually muting a microphone and/or turning off a camera can be error-prone, cumbersome, and may cause participants to question if their audio and video data is being received by the other participants. For example, microphone and/or camera settings from a previous videoconference may carry over into a new videoconference, which may be undesirable if a participant begins speaking while their microphone and/or camera is turned off. To prevent such errors, participants are burdened with having to pay close attention to their videoconferencing settings and manually adjust such settings throughout the videoconference as necessary. This in turn can distract participants during a videoconference and detract from conversational efficiency. Further, no adequate industry standard or specification has been developed to synchronize a participant's audio data, e.g., sound produced by a participant that is picked up by a microphone, with the participant's video data, e.g., video of the participant recorded by a camera.

For many applications, it is useful to determine when a participant is speaking to other participants in the videoconference to provide for a more comprehensive understanding of the videoconference. For example, an active speaker's video stream may be highlighted or expanded on a display to draw attention to the active speaker. The ability to recognize the speech of a participant can be enabled by using machine learning-based speech detection estimation models, but such approaches impose significant hardware and/or processing costs without providing the accuracy for differentiating participant speech that is intended to be heard by others from participant speech that is not, e.g., a side conversation with a person off-camera. Further, such approaches are limited by the time they require to process audio signals, which can cause a delay to exist between the real-time audio that is being produced by the participant and the audio that is output to the remote endpoints of the videoconference. The processing time needed to detect speech in the audio signal can also create a delay between the processed audio and a corresponding video signal, which in turn can cause confusion in the videoconference.

Accordingly, in some examples, the present disclosure provides systems, methods, and media for processing and outputting data in a teleconference or a videoconference. In particular, the present disclosure provides methods of determining if a participant is speaking by analyzing audio and/or video data that is recorded by the participant's microphone and/or camera, respectively. The methods further include determining if a time delay exists between the processed data and the real-time speech of the participant, and adjusting a speed of the processed data to quickly eliminate such a time delay at a conference endpoint. Thus, a participant's microphone may be unmuted for the duration of the videoconference, though the other endpoints of the conference can be provided with a respective audio signal from the participant only when the participant is speaking. By utilizing the disclosed data processing methods, communication between participants in the videoconference may be clearer, and the overall videoconferencing experience may be more enjoyable for the participants. Further, the methods discussed herein are applicable to a wide variety of different locations and room designs, meaning that the disclosed methods may be easily assembled and applied to any particular videoconferencing or teleconferencing setting.

Figure 1:
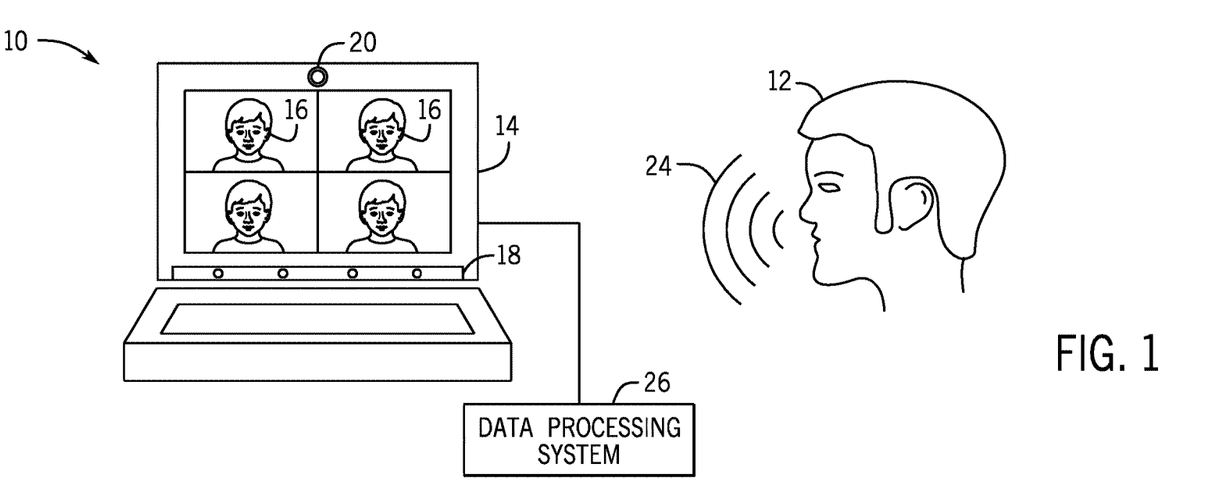
FIG. 1 is an example schematic of a videoconferencing system, according to some examples of the present disclosure.

By way of example, FIG. 1 illustrates an aspect of a videoconferencing system 10 that includes a participant 12 using a device 14 to participate in a videoconference. In some aspects, the participant 12 may be using the device 14 at a remote endpoint of the videoconference to interact with additional participants 16 at other remote endpoints of the videoconference. In some examples, the device 14 is a computer as illustrated in FIG. 1, although it is contemplated that a variety of different devices can be used to participate in a videoconference, such as, e.g., mobile phones, landline phones, smart displays, conference room equipment, and the like. Further, a microphone, i.e., a microphone array 18, and a webcam or camera 20 can be coupled to the device 14. In some aspects, the microphone array 18 is also configured as a speaker array, meaning that the microphone array 18 can receive and output audio signals. While FIG. 1 illustrates the microphone array 18 and the camera 20 as being integral with the device 14, it will be understood that the microphone array 18 and/or the camera 20 can be provided as separate devices in other arrangements.

The microphone array 18 can capture sound, e.g., an audio signal 24, that is produced by the participant 12 and provide the audio signal 24 to a data processing system (DPS) 26 that can also be coupled to the device 14 or provided as software stored within and executed by the device 14, as will be discussed below in greater detail. In a similar way, the camera 20 can capture a video signal of the participant 12 and provide the video signal to the DPS 26. The DPS 26 can then provide the audio signal 24 and/or the video signal to one or more output devices that are located at endpoints of the videoconference, thereby allowing the participant 12 to interact with the other participants 16 in the videoconference.

Generally, when a participant 12 keeps the microphone array 18 unmuted or the camera 20 on, distracting noises and/or visuals may also be transmitted to the remote endpoints of the videoconference, if, for example, a background noise is picked up by the microphone array 18 and/or another person walks within the FOV of the camera 20. According to some examples, however, the DPS 26 can apply the processes described herein to filter the audio and/or video data while the microphone array 18 remains unmuted and/or when the camera 20 remains turned on, which in turn can prevent distracting audio or video from being transmitted to the other endpoints of the videoconference. That is, the DPS 26 analyzes audio and/or visual data to transmit such data only when participant speech is detected. Furthermore, the DPS 26 can temporarily speed up the audio and/or video data output to a far end of the video conference in order to account for any delay in transmitting such audio data as a result of the speech detection processes to better maintain real-time communication during the videoconference.

Figure 2:
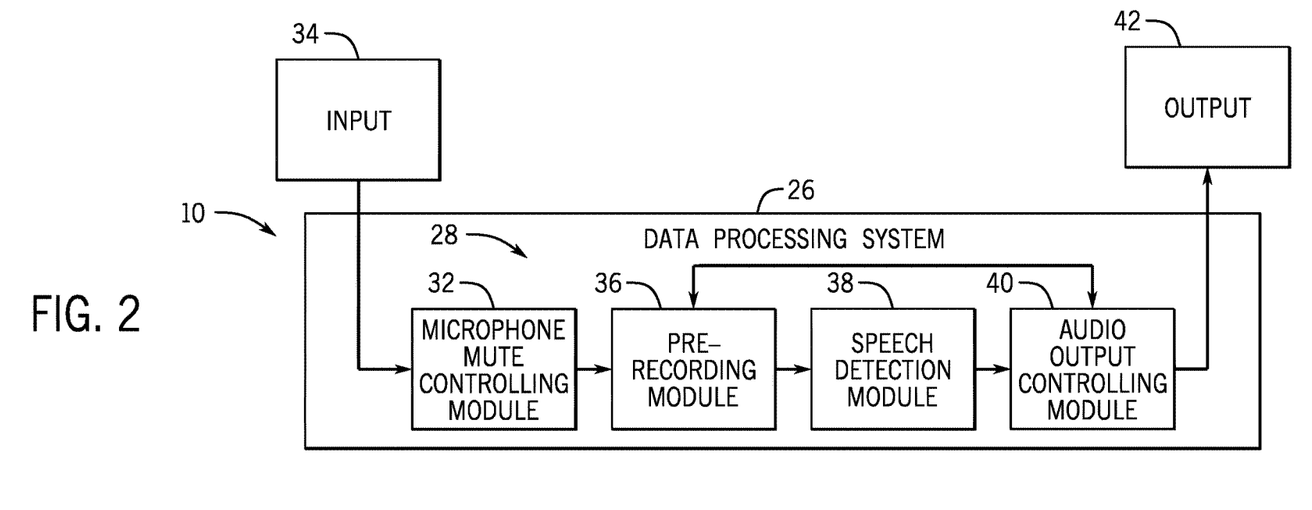
FIG. 2 is a block diagram of a data processing system, according to some examples of the present disclosure.

FIG. 2 illustrates an example schematic block diagram of a processing circuit 28 of the DPS 26. In some aspects, the processing circuit 28 can include a microphone mute-controlling module 32, an audio pre-recording module 36, a speech detection module 38, and/or an audio output-controlling module 40. The processing circuit 28 can receive an audio signal from an input 34 and transmit an audio signal via an output 42. For example, in some aspects, the input 34 includes one or more microphones, e.g., a microphone array, to capture audio produced by the participant and provide the audio signal to the processing circuit 28. The microphones may be of any suitable type, such as, e.g., dynamic, condenser, electret, ribbon, carbon, piezoelectric, fiber optic, laser, omnidirectional, directional, and/or MEMS type. In some aspects, the microphones can be built-in microphones in a videoconferencing device such as the device 14 (see FIG. 1), or the microphones can be separate devices, e.g., headset microphones, webcam microphones, Bluetooth microphones, etc., that are coupled to the DPS 26.

The mute-controlling module 32 can be used to automatically un-mute a participant's microphone when a participant enters a videoconference, thereby allowing the participant's microphone to stay un-muted for the duration of the videoconference. This can advantageously prevent errors that may occur when manually muting and un-muting a microphone to selectively transmit audio to endpoints of the videoconference, as will be discussed in greater detail below. In some examples, the mute-controlling module 32 can defer to manual muting and un-muting of the microphone, meaning that the processing circuit 28 allows a participant to override the mute-controlling module 32, if desired. Thus, absent manual control by the participant, the microphone mute-controlling module 32 can normally un-mute the microphone for the duration of a videoconference.

Referring still to FIG. 2, the audio signal obtained at the input 34 can be provided to the pre-recording module 36, which can store the audio signal for further processing. In some aspects, the pre-recording module 36 can be an audio buffer, meaning that the pre-recording module 36 may temporarily store a digital audio signal to prevent audio loss or audio clipping. In some examples, the pre-recording module 36 may be configured to store a first segment, e.g., a predetermined time period, of an audio signal. For example, the first segment of the audio signal may include the first ten, or the first five, or the first three words spoken by the participant, or the first segment of the audio segment may include about the first 10 seconds of the audio signal, or about the first five seconds of the audio signal, or about the first two seconds of the audio signal, or about the first one second of the audio signal. Thus, it is contemplated that any discussion herein of a pre-recorded audio signal may also be applicable to a first segment of an audio signal, as will be discussed below in greater detail. In this way, the combination of the mute-controlling module 32 and the pre-recording module 36 can ensure that all audio produced by the participant is recorded, which in turn decreases speech recording delay and preserves conversational fluidity in the videoconference.

The speech detection module 38 can determine if the audio signal contains speech produced by the participant by accessing the audio signal stored in the pre-recording module 36. The speech detection module 38 may detect speech using a variety of processes, such as, e.g., embedding/feature extraction, pattern matching, signal power-level detection, etc. In some aspects, the speech detection module 38 can identify speech in the audio signal using an artificial intelligence (AI) machine learning model such as, e.g., hidden Markov models, deep learning models, convolution neural networks, recurrent neural networks, etc. Such methods can be used alone or in combination and, in some aspects, may be selected by the participant through a settings portal of the video conference or the participant's device.

With continued reference to FIG. 2, using a speech detection process, the speech detection module 38 can determine that the audio signal includes speech produced by the participant, which in turn can cause the audio output-controlling module 40 to output the recorded audio signal to an output 42. In some aspects, the output 42 can be at a remote end audio device, such as, e.g., a loudspeaker, a personal computer, a headset, a mobile phone, etc. Thus, the audio output-controlling module 40 can selectively output an audio signal to remote ends of a videoconference based on the determination that the audio signal includes participant speech. If the determination is negative, that is, if the speech detection module 38 does not detect participant speech in the audio signal, the audio output-controlling module 40 may not pass the audio signal to the output 42. In this way, the processing circuit 28 can prevent distracting audio from being transmitted to remote ends of the videoconference, even if the input 34, remains unmuted during the videoconference. Correspondingly, the processing circuit 28 eliminates the need to manually mute and unmute the input 34, which in turn can allow a participant to stay actively engaged in the videoconference.

Furthermore, in some aspects, the audio output-controlling module 40 can detect if a time delay exists between the audio signal that is recorded by the input 34 and the audio signal that is provided from the audio output controlling module 40 to the output 42. Such a time delay may be created as the recorded audio signal is processed along the processing circuit 28. For example, the speech detection module 38 may perform speech recognition for a predetermined time period, e.g., a few seconds, before determining that the recorded audio signal contains speech produced by the participant.

If such a time delay does exist, the audio output-controlling module 40 can adjust an output speed of the audio signal to gradually align the audio signal output to the output 42 with the real-time speed at which the audio signal is being produced at the input 34. Specifically, the audio output-controlling module 40 can access the pre-recording module 36 and adjust a speed of the pre-recorded audio signal stored therein to gradually minimize or substantially eliminate the time delay. For example, the audio output-controlling module 40 may determine that a time delay exists, e.g., if the audio signal to the output 42 is significantly delayed from the real-time audio signal being produced by the participant, and the audio output-controlling module 40 can accelerate the pre-recorded audio signal to gradually eliminate such a time delay. Without such acceleration, the audio signal transmitted to far ends of the video conference may be significantly delayed, disrupting the videoconference and/or causing a discrepancy between the audio and video signals heard and seen at the far end (e.g., the participant's speech may not match up with their lip movement in their video). Alternatively, without pre-recording the audio data and temporarily accelerating the output audio signal, the beginning of the participant's audio may simply be cut off and not transmitted to the far end of the video conference, disrupting the videoconference and/or causing a discrepancy between the audio and video signals heard and seen at the far end.

Figure 3:
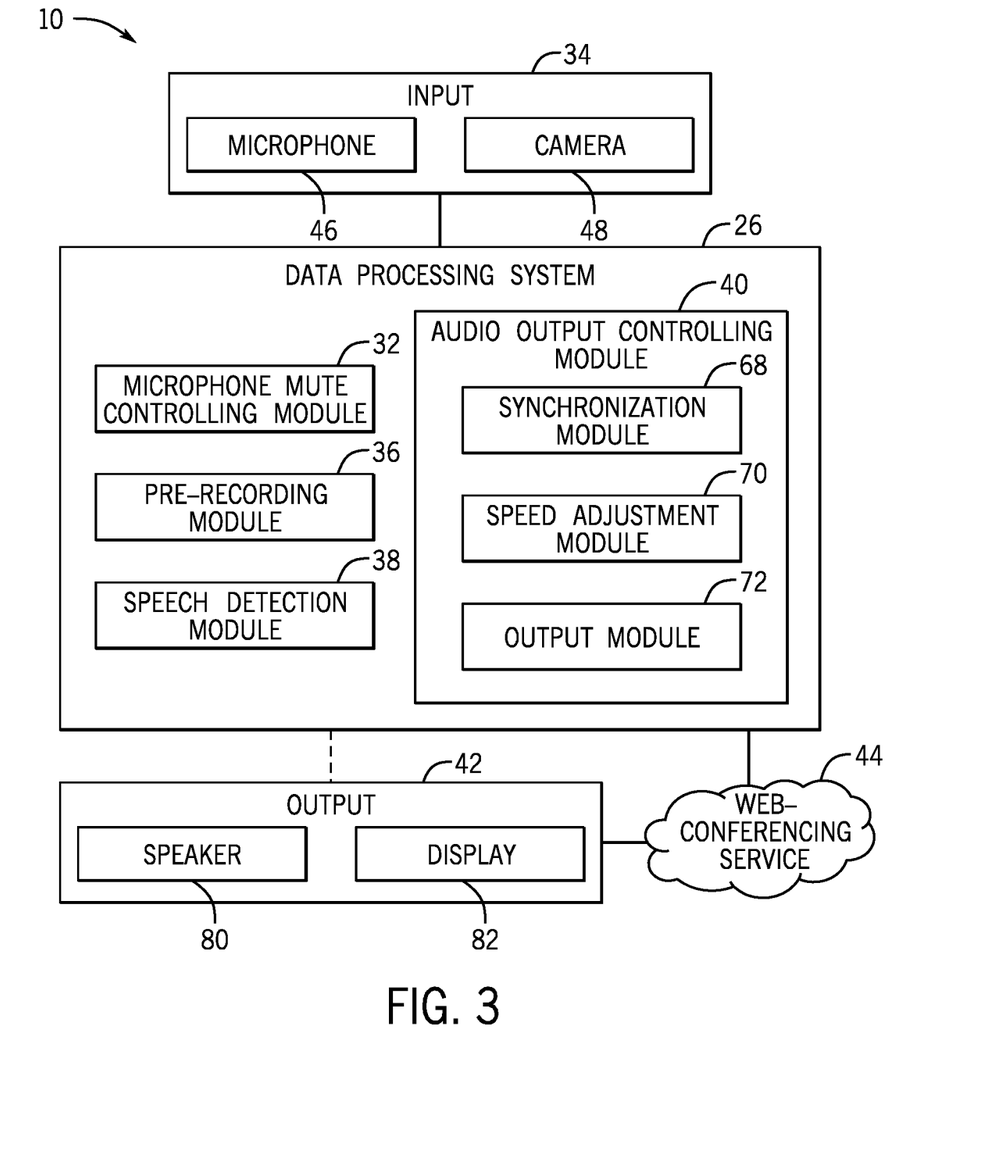
FIG. 3 is a block diagram of the videoconferencing system of FIG. 1.

Referring now to FIG. 3, an example block diagram is illustrated of the videoconferencing system 10, which can include an input 34, the DPS 26, an output 42, and a web-conferencing service 44. While the aspects of the videoconferencing system 10 are described as relating to a single participant, i.e., a single remote endpoint of a video-conference, it will be understood that the systems and methods herein are applicable each remote endpoint in a videoconference and to additional videoconferencing arrangements, e.g., a conference room with multiple participants. As discussed above, the input 34 can be used to record participant data that is then processed using the DPS 26. For example, the input 34 can include a microphone 46 and/or a camera 48 to record audio and/or visual data, respectively. While the input 34 is depicted in FIG. 3 as a single component including the microphone 46 and the camera 48, it should be noted that the system 10 may include multiple separate inputs 34 in some applications. Additionally, in some applications, the input 34 may only include a microphone 46. For example, in one application, the system 10 may be a teleconferencing system that only processes and transmits audio signals.

Referring still to FIG. 3, the input 34 can be coupled to the DPS 26, and the DPS 26 can include the microphone mute-controlling module 32, the pre-recording module 36, the speech detection module 38, and the audio output-controlling module 40. As described above with respect to FIG. 2, the microphone mute-controlling module 32 can be used to automatically un-mute the microphone 46 when the participant joins the videoconference, although it is contemplated that the participant may override the mute-controlling module 32 by manually muting/un-muting the microphone if desired. When un-muted, the microphone 46 can record an audio signal, and the audio signal can be stored in the pre-recording module 36 as a digital pre-recorded audio signal. The audio signal is then provided to the speech detection module 38 which applies a speech detection technique, as discussed above, to detect if the audio signal does or does not contain speech produced by the participant. In some aspects, the speech detection module 38 can differentiate the participant's speech from speech produced by other persons. For example, the speech detection module 38 may include one or more learning models that are trained to recognize a particular person's speech patterns.

Figure 4:
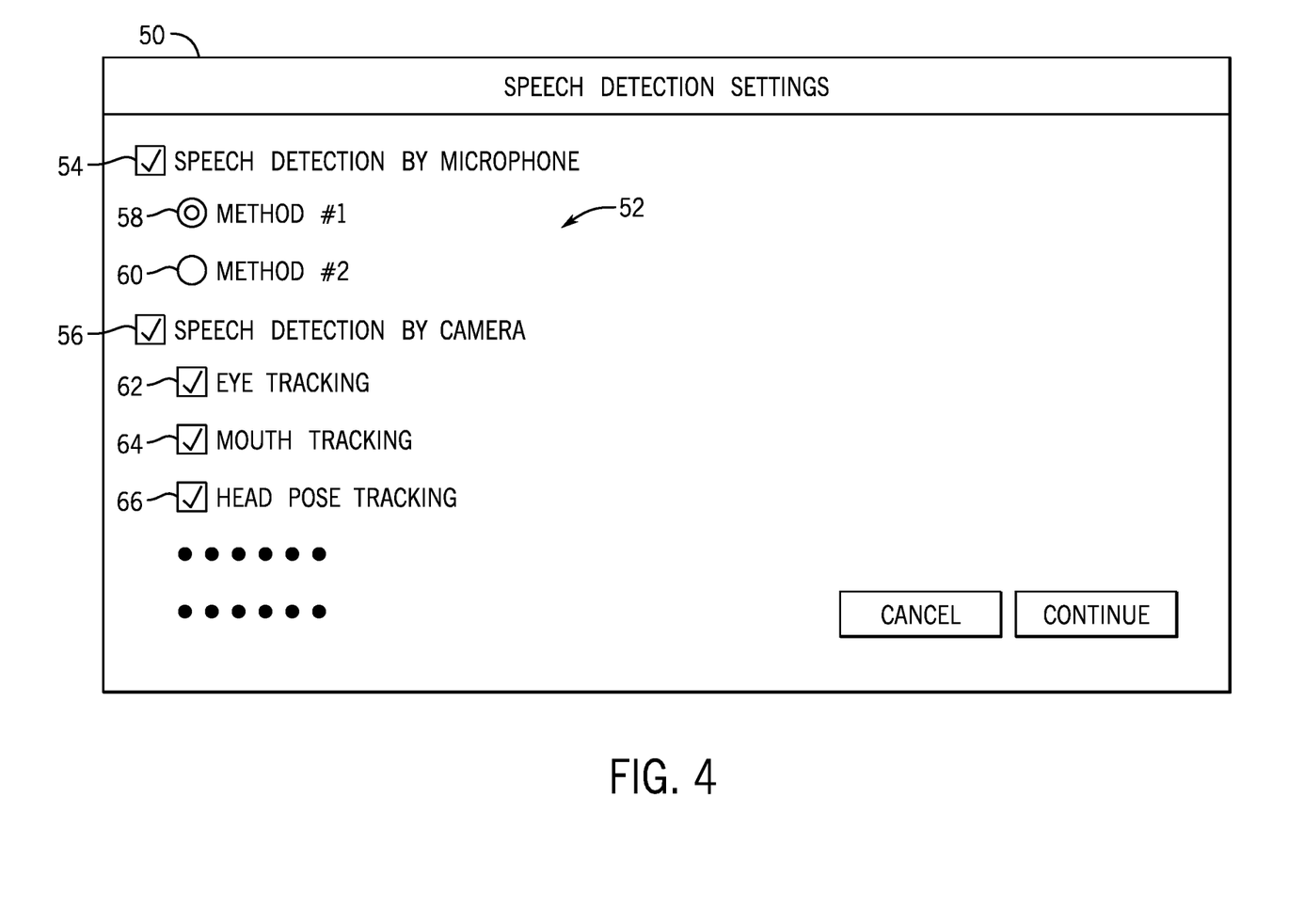
FIG. 4 is an example screen of a graphical user interface for configuring speech detection settings, according to some examples of the present disclosure.

In some examples, an installer or participant can manually adjust the settings of the speech detection module 38 using, for example, a graphical user interface (GUI) on a display of a device. For example, FIG. 4 illustrates an example screen with a graphical user interface (GUI) 50 for receiving user input to configure speech detection settings. It is contemplated that the GUI may be accessible in a variety of different ways, such as, e.g., under a settings tab in a videoconferencing software application, under settings in an audio driver, visible in gaming software user interfaces, and/or under general computer settings. In some aspects, the GUI 50 includes a menu of speech detection settings 52 that can be manually changed before, during, and/or after a videoconference. Further, a variety of different inputs may be used to allow a participant to control certain aspects in the GUI 50, including any acceptable human interface devices, e.g., touch enabled devices, button inputs, keyboards, mice, track balls, joysticks, touch pads, and/or the like. The speech detection settings 52 may be provided in any suitable format, such as drop-down menus (DDLs), field boxes, selection boxes, etc. In the non-limiting example illustrated in FIG. 4, the speech detection settings 52 are provided as selection boxes, including at least a "speech detection by microphone" selection box 54 and a "speech detection by camera" selection box 56. Accordingly, a participant can customize the speech detection settings 52 to suit the participant's environment. For example, the participant may select the "speech detection by microphone" selection box 54 and de-select the "speech detection by camera" selection box 56 if the participant is in range of the microphone 46 but not in view of the camera 48, e.g., if the participant is standing up or walking around during the videoconference.

Further, the speech detection settings 52 may include one or more sub-settings under the selection boxes 54, 56 that can be selected to change the method of speech detection. For example, the GUI 50 can include a "Method #1" selection box 58 and a "Method #2" selection box 60 positioned under the "speech detection by microphone" selection box 54, where "Method #1" and "Method #2" each correspond to different audio speech detection processes, e.g., short-time detection, AI model detection, power level detection, etc. Correspondingly, the GUI 50 can include sub-settings under the "speech detection by camera" selection box 56, such as, e.g., an "Eye tracking" selection box 62, a "Mouth tracking" selection box 64, and/or a "Head pose tracking" selection box 66. Thus, the speech detection module 38 (shown in FIG. 3) can be configured to detect speech from an audio signal, a video signal, or both via a variety of different selectable methods. Further, it is contemplated that the GUI 50 may include settings or options other than the speech detection settings 52 illustrated in FIG. 4.

Returning to FIG. 3, the speech detection module 38 can provide the audio output-controlling module 40 with a determination after performing speech detection on the data recorded by the input 34. If speech is found to exist in the recorded audio signal, the audio output-controlling module 40 can prepare the audio signal to be output to remote endpoints of the videoconference. If the speech detection module 38 does not detect speech in the audio signal, the audio output-controlling module 40 may not transmit the audio signal to remote endpoints of the videoconference. In this way, the audio output-controlling module 40 can automatically prevent sounds other than participant speech, e.g., distracting background noises, from being transmitted to other participants in the videoconference, even if the microphone 46 remains un-muted for the duration of the videoconference. In other words, the audio output-controlling module 40 achieves the effect of manually muting the microphone 46 while also eliminating the need for the participant to constantly pay attention to the status of the microphone 46, which in turn can allow the participant to focus on the subject matter of the videoconference and lead to a more cohesive videoconferencing experience.

Additionally, the audio output-controlling module 40 can adjust an output speed of the audio signal to reduce or eliminate any time delay that exists therein, e.g., a time delay that is created between the received, real-time audio signal and the pre-recorded audio signal as a result of processing the pre-recorded audio signal in the DPS 26. To that end, the audio output-controlling module 40 can include a synchronization module 68 to determine if a time delay exists, a speed adjustment module 70 to adjust a speed of the pre-recorded audio signal stored in the pre-recording module 36, and an output module 72 to transmit the adjusted audio signal from the DPS 26.

Figure 5:
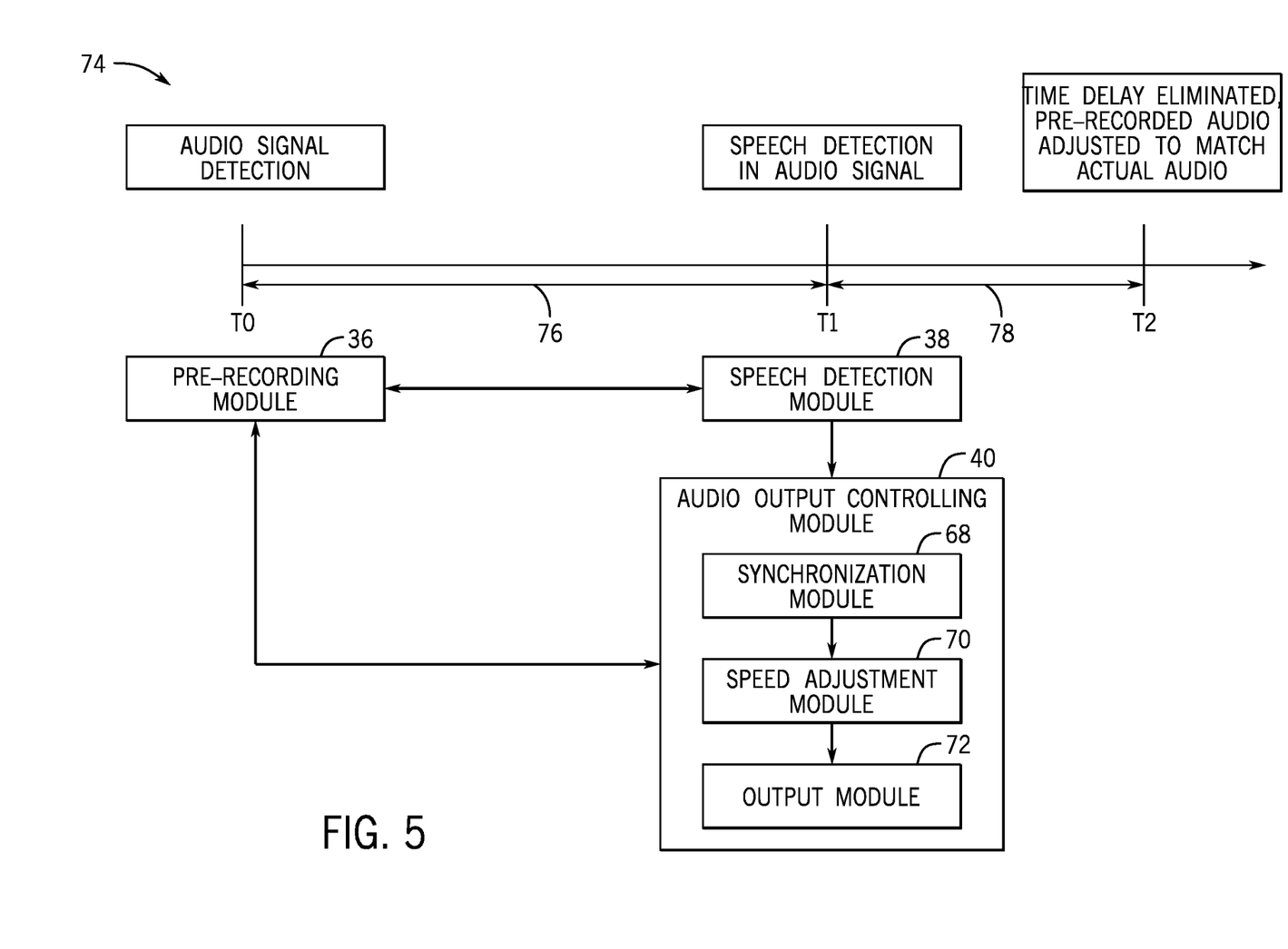
FIG. 5 is a time series chart for adjusting a speed of an audio signal using the videoconferencing system of FIG. 1.

Referring now to FIG. 5, an example time series chart 74 is shown to demonstrate how the output speed of the audio signal is adjusted using the audio output-controlling module 40. Specifically, the chart 74 illustrates that the audio signal can be recorded at a first timestamp T0, meaning that the microphone 46 (see FIG. 3) can detect and receive the audio signal and the pre-recording module 36 can begin storing the audio signal at the first timestamp T0. The speech detection module 38 is then utilized to determine if the audio signal includes speech produced by the participant, a second timestamp T1 can be generated upon detecting participant speech in the audio signal, resulting in a determination to output the audio signal to a far end of the videoconference. Further, the synchronization module 68 can compare the first timestamp T0 (e.g., time at which the audio signal is received) with the second timestamp T1 (e.g., time at which it is determined to output such audio signal) to determine if a significant time delay exists therebetween. For example, the synchronization module 68 may determine that the second timestamp T1 occurs later than the first timestamp T0, meaning that a time delay, e.g., a first time period 76, exists between determining that the pre-recorded audio signal should be output and the true speed of the audio signal. Upon such a determination, the synchronization module 68 can calculate the speed at which the pre-recorded audio must be output to eliminate the time delay 76 by a future third timestamp T2. However, an additional time delay, e.g., a second time period 78, may exist between the second timestamp T1 and the third timestamp T2, so the synchronization module 68 may calculate the total time delay to be the sum of the first time period 76 and the second time period 78.

After the synchronization module 68 performs the above determination, the speed adjustment module 70 can access the pre-recording module 36 and adjust the output speed of the pre-recorded audio signal. For example, if the synchronization module 68 determines that the second timestamp T1 occurs later than the first timestamp T0 by a threshold amount, the speed adjustment module 70 can accelerate an output speed of the pre-recorded audio signal and output the accelerated audio signal at the second timestamp T1. Specifically, the pre-recorded audio signal can be accelerated to align with the real-time audio signal, e.g., the real-time signal that is being produced by the participant, at or before the third timestamp T2. Put another way, the pre-recorded audio signal can be accessed at the second timestamp T1, accelerated through the second time period 78 until reaching the third timestamp T2, when it has caught up with the real-time audio signal and may again be output at a normal (i.e., unaccelerated) rate. As discussed above, the pre-recorded audio signal may include a first segment of an audio signal, meaning that an output speed of a first segment of an audio signal can also be adjusted by the speed adjustment module 70.

Further, the speed adjustment module 70 may a dynamic module, meaning that the speed adjustment module 70 can adjust the output speed according to a variety of dynamic factors, such as, e.g., delay time, speech rate, processing settings, silent audio clips, etc. Thus, in some examples, the speed adjustment module 70 may dynamically adjust the speed of the pre-recorded audio signal proportionally with respect to a size of the time delay, meaning that greater acceleration can be used to eliminate larger time delays. For example, the speed adjustment module 70 may accelerate the pre-recorded audio at a speed that is 1.2 times faster than the real-time audio signal speed to eliminate a first time delay, and/or the speed adjustment module 70 may accelerate the pre-recorded audio at a speed that is 1.1 times faster than the real-time audio signal speed to eliminate a second time delay that is less than the first time delay. Alternatively, if no time delay exists, e.g., if the first timestamp T0 and the second timestamp T1 occur simultaneously or substantially simultaneously (e.g., the time delay is nominal, below a threshold amount), the audio output-controlling module 40 may not adjust the speed of the pre-recorded audio signal. Accordingly, it is an advantage of the disclosure that the audio output-controlling module 40 can selectively adjust the speed of a pre-recorded audio signal to reduce and/or eliminate any time delay that may be created as the pre-recorded audio signal is processed in the DPS 26. In this manner, a participant at a videoconferencing end point will not notice any delay in or clipping of the speaking participant's speech as a result of the processing time required by the DPS 26 for speech detection.

Referring back to FIG. 3, the audio signal can be transmitted from the DPS 26 at the adjusted speed using the output module 72. In some aspects, the adjusted audio signal is transmitted to a web-conferencing service 44, such as, e.g., Zoom, Microsoft Teams, Cisco Webex, Google Meet, etc., before then being transmitted to the output 42 at a conference endpoint. In other examples, the output module 72 may transmit the audio signal directly to the output 42. As discussed above, for example, the output 42 can include a speaker 80 and/or a display 82 to output audio and/or video data, respectively. In particular, the speaker 80 can be used to output the audio signal at the adjusted first speed as a result of the processing performed by the DPS 26, as discussed above. While the output 42 is depicted in FIG. 3 as a single component including the speaker 80 and the display 82, it should be noted that the system 10 may include multiple separate outputs 42 in some applications.

Figure 6:
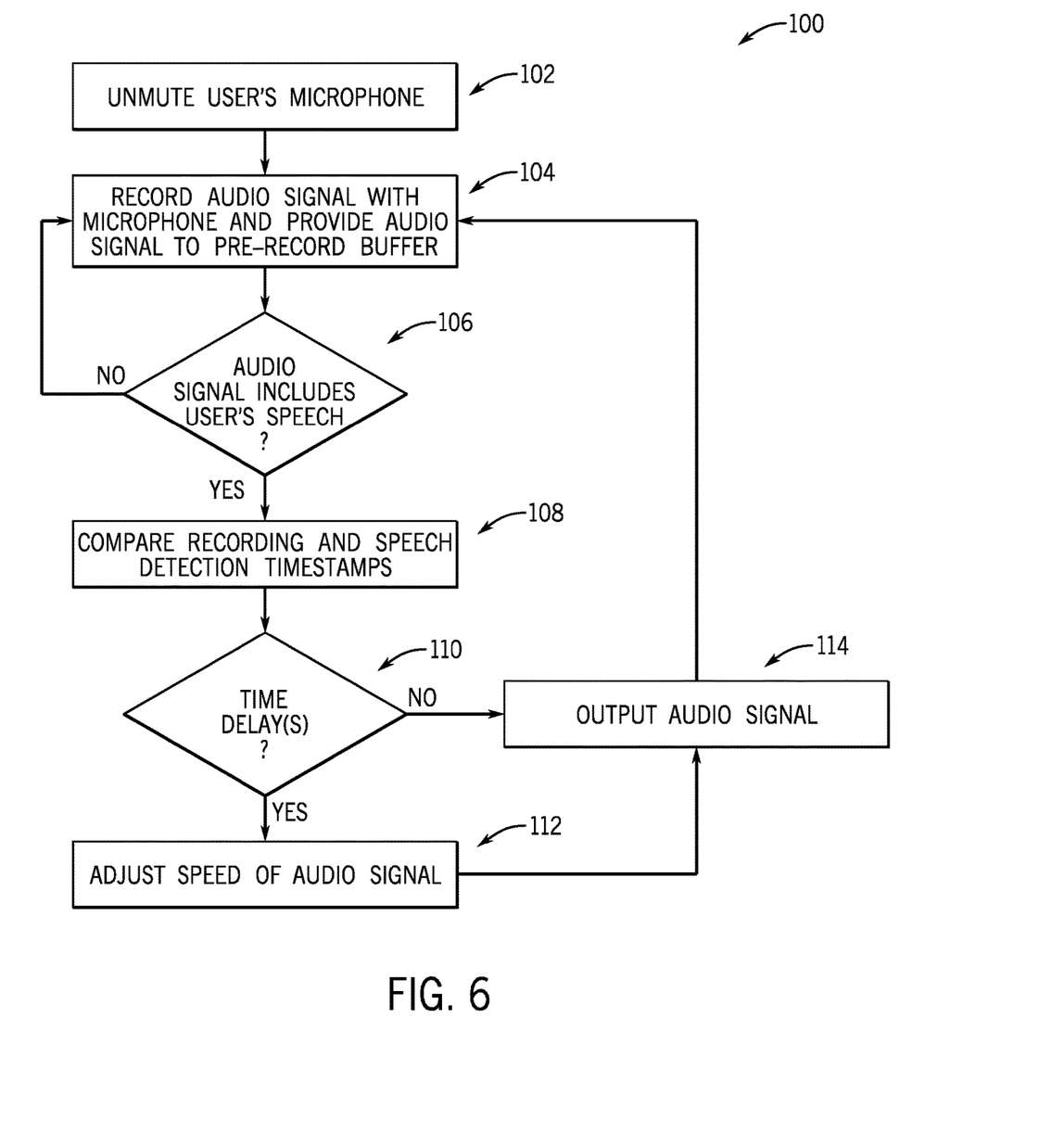
FIG. 6 is a flowchart of a method of implementing the videoconferencing system of FIG. 1.

In light of the above, FIG. 6 illustrates an example method 100 of implementing the videoconferencing system 10. In some aspects, the steps of the method 100 can be stored as instructions stored in memory and carried out via modules of the DPS 26 described above. Furthermore, while the steps of FIG. 6 are illustrated in a particular order, in some aspects, the steps may be carried out in a different order, simultaneously, and/or more or fewer steps may be carried out.

Referring still to FIG. 6, at step 102, the method 100 can include automatically unmuting a microphone that is associated with a participant or user by using a microphone mute-controlling module when the user joins a videoconference. As discussed above, the user can optionally override the microphone mute-controlling module by manually muting the microphone. Further, the microphone mute-controlling module can be in communication with and/or connected to a monitor and/or a codec that includes a memory and a processor, as will be discussed below in greater detail. At step 104, the method 100 includes recording an audio signal with the microphone and then providing or transmitting the audio signal to a pre-recording module, e.g., a pre-recording buffer. The pre-recording buffer may be configured to store the audio signal or at least a segment of the audio signal. At step 106, the method 100 can include determining if the audio signal recorded by the microphone includes speech produced by the user and, if the audio signal is determined not to include user speech, returning to step 104. However, if the audio signal is determined to include user speech at step 106, the method 100 can include additional processing steps.

Specifically, the method 100 can proceed to step 108, in which timestamps corresponding to the time at which the audio signal is first recorded by the microphone and the time at which speech is detected in the audio signal are compared. Put another way, a first timestamp can be generated upon initially recording the audio signal, and a second timestamp can be generated upon determining that the audio signal includes speech produced by the user. At step 110, the method 100 can include determining if a time delay exists between the first timestamp and the second timestamp. That is, step 110 can include determining if the first timestamp occurs earlier than the second timestamp. If such a delay is determined to exist, e.g., if the difference between the second timestamp and the first timestamp exceeds a threshold amount, the method 100 can include step 112 of adjusting a first speed of the audio signal to gradually reduce or eliminate the time delay. For example, the output-controlling module can be used to accelerate the pre-recorded audio signal relative to the real-time speed at which the audio signal is produced if the second timestamp occurs later than the first timestamp. It is contemplated that the speed of the audio signal can be accelerated at any rate suitable to reduce the time delay, e.g., 1.1×, 1.2×, 1.5×, 2×, etc.

After the speed of the audio signal is adjusted, the method 100 can include step 114 of outputting the audio signal at the adjusted speed. In this way, the output audio can gradually align with the real-time speed at which the audio signal is being produced, which in turn can reduce audio delay and lead to a more desirable videoconferencing experience. Alternatively, if no time delay is determined to exist at step 110, the method 100 can proceed directly to outputting the unaltered audio signal at step 114. After outputting the audio signal, the method 100 can return to step 104 and repeat steps 104, 106, 108, 110, 112, and/or 114 to continue recording, processing, and outputting audio during the videoconference. As a result, the method 100 can determine when the output audio signal has "caught up" with the input audio signal, and speed adjustments to the audio signal no longer need to be made.

Generally, the method 100 can be performed in real-time or near real-time. For example, in some aspects, the steps 102, 104, 106, 108, 110, 112, and 114 of the method 100 are repeated after a period of time has elapsed, such as, e.g., at least every 30 seconds, or at least every 15 seconds, or at least every 10 seconds, or at least every 5 seconds, or at least every 3 seconds, or at least every second, or at least every 0.5 seconds. It should be noted that the above method 100, or any methods or processes described herein, can be implemented as a set of instructions, tangibly embodied on a non-transitory computer-readable media, such that a processor device can implement the instructions based upon reading the instructions from the computer-readable media.

Figure 7:
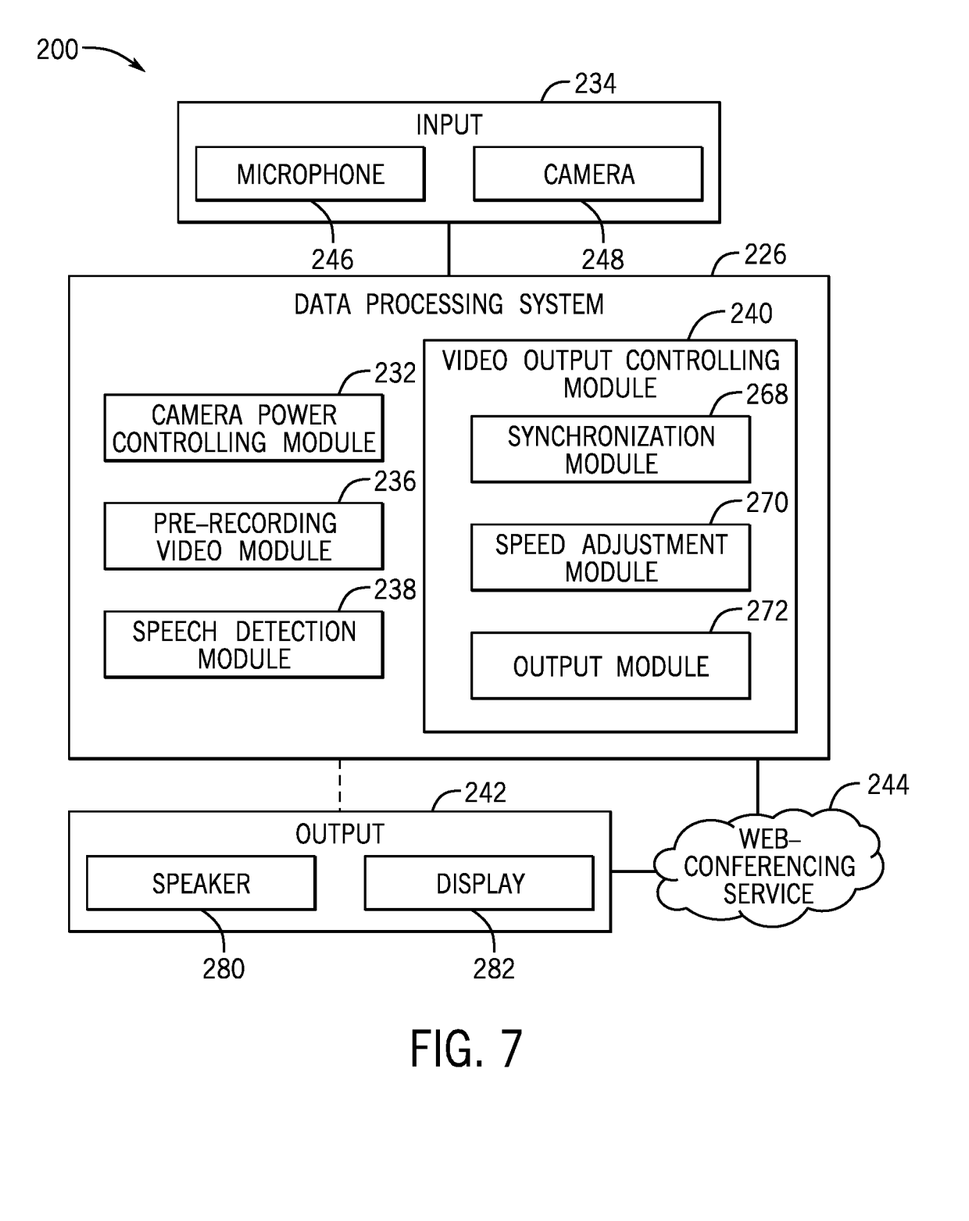
FIG. 7 is a block diagram of another videoconferencing system, according to some examples of the present disclosure.

The above methods and systems generally relate to processing and adjusting audio data. However, such systems and methods may equally apply to video data in some aspects. For example, FIG. 7 illustrates an example block diagram of another videoconferencing system 200, according to some aspects. It will be understood that any components or aspects of the videoconferencing system 200 may also be compatible with the videoconferencing system 10 illustrated in FIG. 3, and that the videoconferencing systems 10, 200 may be combined in a single videoconferencing system, as will be discussed below in greater detail. In general, the videoconferencing system 200 may be configured to record, process, and output a video signal in a similar way to how the videoconferencing system 10 records, processes, and outputs an audio signal to prevent distracting data from being transmitted to remote endpoints of a videoconference. Thus, elements of the videoconferencing system 200 that are shared with, i.e., that are structurally and/or functionally identical or similar to, elements present in the videoconferencing system 10 are represented by like reference numerals in the 200 series.

In the non-limiting example illustrated in FIG. 7, the videoconferencing system 200 can include a DPS 226, a camera power-controlling module 232, an input 234, a pre-recording video module 236, a speech detection module 238, a video output-controlling module 240, and a web-conferencing service 244. Similar to the input 34 of FIG. 3, the input 234 can include one or more input devices, such as, e.g., a microphone 246 and a camera 248 to record audio and/or video data, respectively. Further, the power-controlling module 232 can be used to automatically power on the camera 248 when the participant joins the videoconference, although it is contemplated that the participant may override the power-controlling module 232 by manually powering off the camera 248 if desired.

The video signal recorded by the camera 248 can be stored in the pre-recording video module 236 as a pre-recorded video signal. In some aspects, the pre-recording video module 236 is configured to store a first segment, e.g., a predetermined time period, of a video signal. For example, the first segment of the video signal may include the first 30, or the first 15, or the first 5 frames of the video signal, or the first segment of the video signal may include about the first 10 seconds of the video signal, or about the first five seconds of the video signal, or about the first two seconds of the video signal, or about the first second of the video signal. Thus, it is contemplated that any discussion herein of a pre-recorded video signal may also be applicable to a first video segment of a video signal, as will be discussed below in greater detail.

Further, the speech detection module 238 can be used to determine if the participant is speaking by applying a speech detection process to input audio and/or video signals, similar to the speech detection module 38 of FIG. 3 described above. If the speech detection module 238 confirms that the participant is speaking, the video output-controlling module 240 may access the pre-recording video module 236 and, if necessary, adjust the pre-recorded video signal to improve the videoconferencing experience.

With continued reference to FIG. 7, the video output-controlling module 240 can include a synchronization module 268, a speed adjustment module 270, and an output module 272. The synchronization module 268 can be used to determine if a first time delay exists between the pre-recorded video signal being received and a time of speech detection. For example, the synchronization module 268 can compare a first timestamp, e.g., a timestamp generated upon initiation of video recording, with a second timestamp, e.g., a timestamp generated upon determining that the participant is speaking. If the second timestamp is different or occurs later than the first timestamp, e.g., if a first time delay exists between the first and second timestamps, the synchronization module 268 can calculate the speed at which the pre-recorded video signal can be output to gradually reduce and/or eliminate the time delay. Additionally, in some aspects, the synchronization module 268 can also determine if a second time delay exists between the pre-recorded video signal and a pre-recorded audio signal. For example, a fourth timestamp may be generated when sound is first recorded by the microphone 246, and the synchronization module 268 can compare the first timestamp with the fourth timestamp to determine if a second time delay exists therebetween. Upon such a determination, the synchronization module 268 may calculate speeds at which both the pre-recorded audio signal and the pre-recorded video signal may be output to gradually reduce and/or the second time delay. This in turn can lead to a more synchronized combination of audio and video data being output to remote ends of the videoconference.

If the synchronization module 268 detects the first time delay and/or the second time delay, the speed adjustment module 270 can access the pre-recording video module 236 and adjust the output speed of the pre-recorded video signal. For example, the speed adjustment module 270 can accelerate a first speed of the video signal if the first timestamp associated with the initiation of video recording occurs before the second timestamp associated with positive speech recognition. By accelerating the video signal, the speed adjustment module 270 can reduce video latency, leading to a smoother video being output to remote endpoints of the videoconference in real time.

Further, the speed adjustment module 270 may also accelerate or decelerate the video signal and/or an audio signal if the first timestamp associated with the initiation of video recording is different than the fourth timestamp associated with the initiation of audio recording. For example, the speed adjustment module 270 may decelerate the first speed of the video signal, accelerate the second speed of the audio signal, or both to eliminate the second time delay. Accordingly, it will be understood that the speed adjustment module 270 can adjust speeds of audio and/or video signals recorded by the input 234 to provide aligned data streams to remote endpoints in a videoconference. However, the speed adjustment module 270 may leave audio and/or video signals unaltered if no time delay is determined to exist or if a time delay exists below a pre-defined threshold.

With continued reference to FIG. 7, the video signal can be transmitted from the DPS 226 at the adjusted speed using the output module 272. In some aspects, the adjusted audio signal is transmitted to a web-conferencing service 244, such as, e.g., Zoom, Microsoft Teams, Cisco Webex, Google Meet, etc., before then being transmitted to the output 242, or the output module 272 may transmit the audio signal directly to the output 242. As discussed above, the output 242 can include output devices that are located at endpoints of the videoconference, such as a speaker 280 and a display 282 to output audio and/or visual data, respectively. In particular, the display 282 can be used to output the video signal at the adjusted first speed as a result of the processing performed by the DPS 226, as discussed above.

Figure 8:
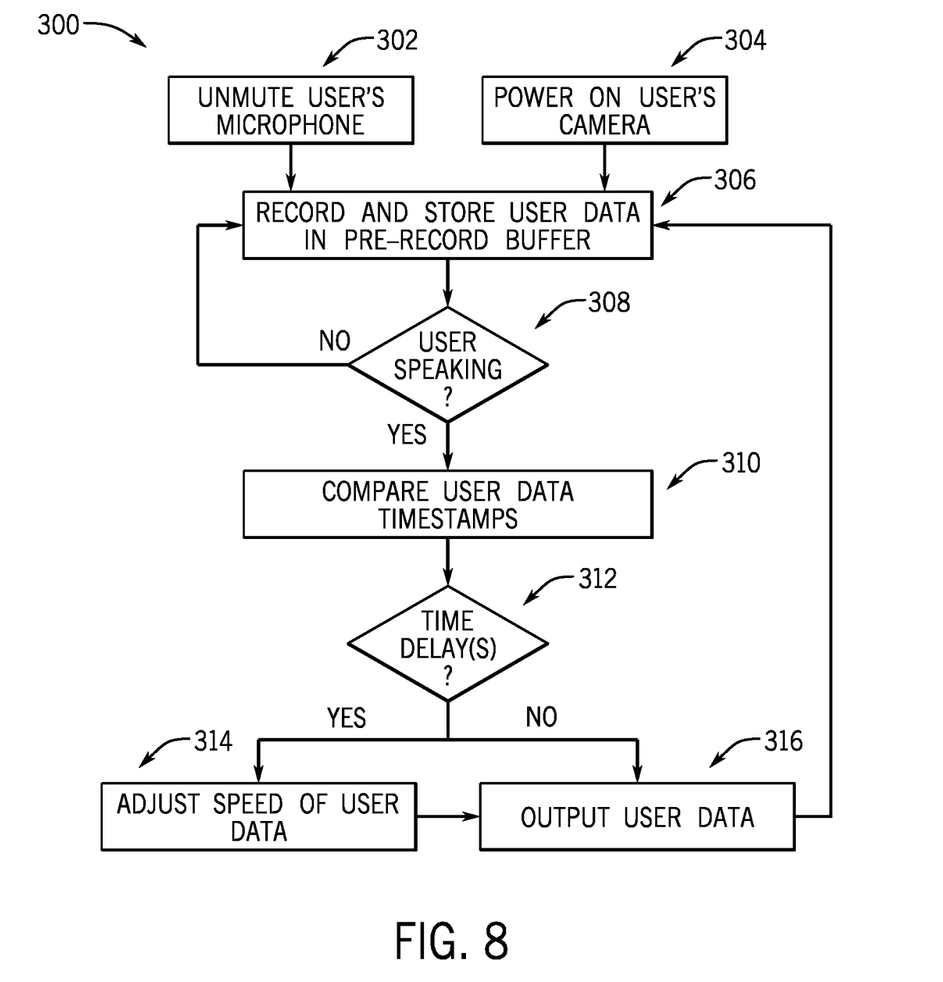
FIG. 8 is a flowchart of a method of implementing the videoconferencing system of FIG. 7.

FIG. 8 illustrates a method 300 of implementing the videoconferencing systems 10, 200 discussed above. At steps 302 and 304, the method 300 can include automatically unmuting a microphone and powering on a camera, respectively, that are associated with a participant when the participant joins a videoconference. At step 306, the method 300 can include recording and storing data associated with the participant in a pre-recording module or buffer. In some examples, the user data can include audio and video signals, which are recorded with the microphone and the camera, respectively. Further, the pre-recording buffer may be configured to store the user data or at least segments of the user data. At step 308, the method 300 can include determining if the user is speaking in the videoconference, e.g., using audio and/or visual speech detection techniques. If the user is determined not to be speaking in the videoconference, the method can return to step 306, such that no audio or video data is output to far ends of the video conference. However, in some applications, video data may still be output though audio data is not output following such determination at step 308.

If the user is determined to be speaking at step 308, the method 300 may proceed to step 310, which can include comparing timestamps associated with the user data, the timestamps being generated at various points along the method 300. Specifically, at step 310, the method 300 can include comparing timestamps corresponding to the times at which the user data is first recorded by the microphone and/or the camera, and the time at which the user is determined to be speaking. For example, a first timestamp can be generated upon initially recording the audio signal, a second timestamp can be generated upon initially recording the video signal, and a third timestamp can be generated upon determining that the user is speaking in the videoconference. At step 312, the method 300 can include determining if any time delays exist in the user data, e.g., time delays between any combination of the timestamps discussed above. That is, step 312 includes determining if the first timestamp is different, e.g., occurs earlier or later, than the second timestamp and/or the third timestamp. Additionally, step 312 can include determining if the second timestamp is different e.g., occurs earlier or later, than the first timestamp and/or the third timestamp.

If a time delay is determined to exist, the method 300 can include step 314 of adjusting a first speed of the participant data relative to a real-time speed at which the participant data is being produced to gradually reduce or eliminate the time delay and/or synchronize audio and video data. For example, the output-controlling module can be used to accelerate the pre-recorded audio signal and/or the pre-recorded video signal relative to a real-time speed at which such signals are produced if the first timestamp and/or the second timestamp, respectively, are determined to occur earlier than the third timestamp. Correspondingly, the output-controlling module can be used to adjust the speeds of the pre-recorded audio signal and/or the pre-recorded video signal relative to one another if a time delay exists between the first timestamp and the second timestamp. For example, the output-controlling module may accelerate a first speed of the pre-recorded audio signal, accelerate a second speed of the pre-recorded video signal, or both if the first timestamp is determined to have occurred later than the second timestamp. Thus, it is contemplated that the speed of the participant data can be adjusted at any rate suitable to reduce the time delay, e.g., 1.1×, 1.2×, 1.5×, 2×, −1.1×, −1.2×, −1.5×, −2×, etc. In one example, audio data can be accelerated while video data may be decelerated (i.e., adjusted by a factor less than one) so that the output appears more synchronized and less visually disruptive to a user at the far end of the video conference until the participant data catches up.

Further, the method 300 can include step 316 of outputting the participant data, or normal speed if no time delays exist, or at the adjusted speed if time delays exist. In this way, the output audio and video data can gradually align with the real-time speed at which the audio signal and video signals are being produced, which in turn will reduce audio and/or video delay and lead to a more desirable videoconferencing experience. As noted above, if no time delay is determined to exist at step 312, the method 300 can proceed directly to outputting the unaltered user data at step 316. After outputting the audio signal, the method 300 can return to step 306 and repeat steps 306, 308, 310, 312, 314, and/or 316 to continue recording, processing, and outputting user data during the videoconference.

Generally, the method 300 can be performed in real-time or near real-time. For example, in some aspects, the steps 302, 304, 306, 308, 310, 312, 314, and 316 of the method 300 are repeated after a period of time has elapsed, such as, e.g., at least every 30 seconds, or at least every 35 seconds, or at least every 30 seconds, or at least every 5 seconds, or at least every 3 seconds, or at least every second, or at least every 0.5 seconds. It should be noted that the above method 300, or any methods or processes described herein, can be implemented as a set of instructions, tangibly embodied on a non-transitory computer-readable media, such that a processor device can implement the instructions based upon reading the instructions from the computer-readable media.

Figure 9:
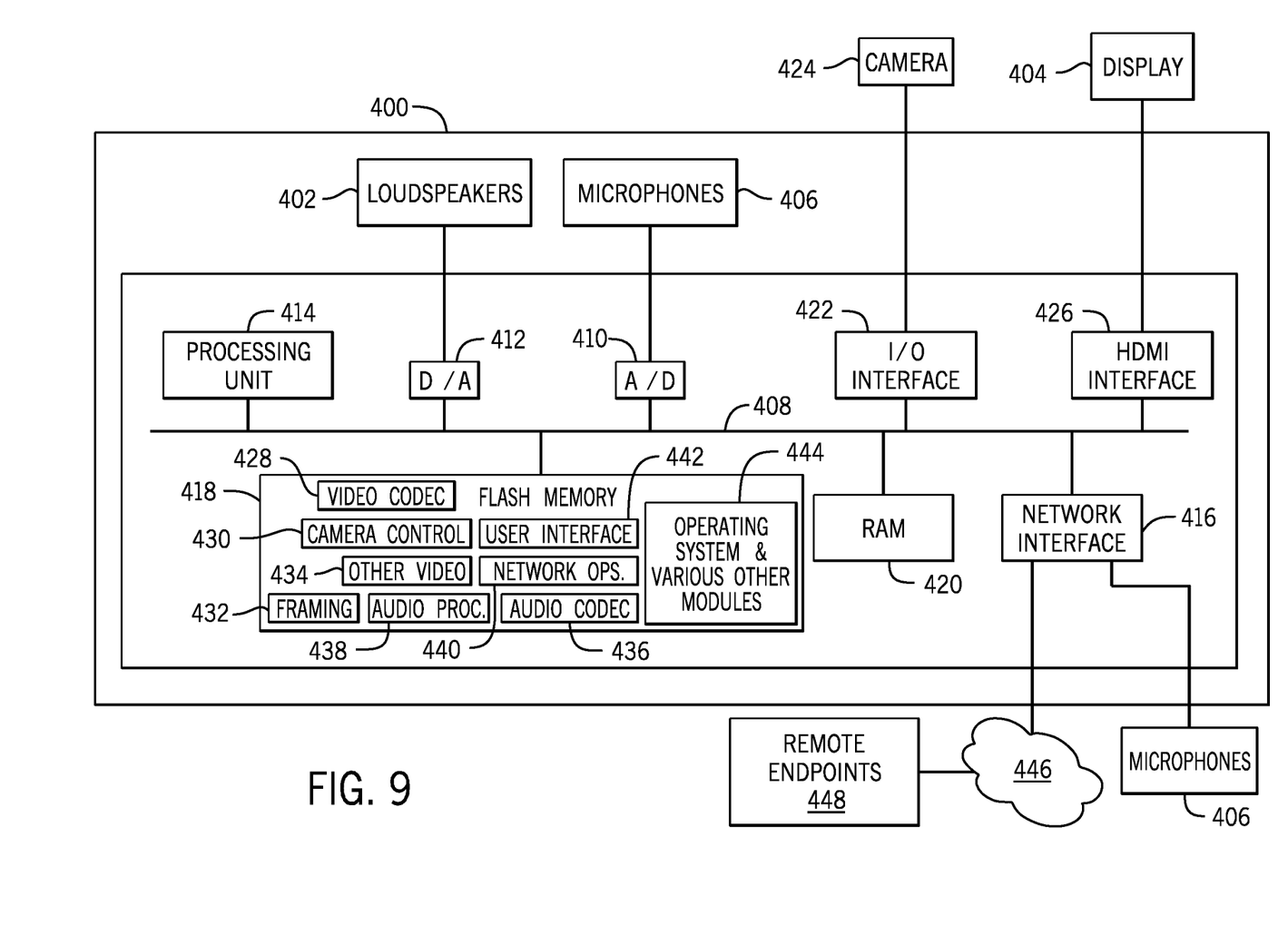
FIG. 9 is a schematic of an example codec, according to some examples of the present disclosure.

FIG. 9 illustrates aspects of a codec 400 according to some examples of the present disclosure. In some aspects, a codec 400 may be a separate device of a videoconferencing system or may be integrated within a participant's videoconferencing device, e.g., a computer, a mobile phone, a tablet, etc. Generally, the codec 400 includes machine readable instructions to maintain a video call with one or more videoconferencing end points, receive audio and video streams from microphones and cameras, respectively, and encode and composite the streams, according to the methods described herein, to send to the one or more remote end points. In some applications, components of the videoconferencing systems 10, 200 described above may be incorporated into or coupled to the codec 400.

As shown in FIG. 9, the codec 400 may include loudspeaker(s) 402, though in many cases the loudspeaker 402 is provided in a display 404. The codec 400 may include microphone(s) 406 interfaced via a bus 408, connected through an analog to digital (A/D) converter 410, and the loudspeaker 402 is connected through a digital to analog (D/A) converter 412. The codec 400 also includes a processing unit 414, a network interface 416, a flash or other non-transitory memory 418, RAM 420, and an input/output (I/O) general interface 422, all coupled by the bus 408. A camera 424 is connected to the I/O general interface 422. Additional microphone(s) 406 are connected to the network interface 416. An HDMI interface 426 is connected to the bus 408 and to the external display or monitor 404. Bus 408 is illustrative and any interconnect between the elements can used, such as Peripheral Component Interconnect Express (PCie) links and switches, Universal Serial Bus (USB) links and hubs, and combinations thereof. The camera 424 and microphones 406, 406 can be contained in housings containing the other components or can be external and removable, connected by wired or wireless connections.

The processing unit 414 can include digital signal processors (DPSs), central processing units (CPUs), graphics processing units (GPUs), dedicated hardware elements, such as neural network accelerators and hardware codecs. The flash memory 418 stores modules of varying functionality in the form of software and firmware, generically programs or machine readable instructions, for controlling the codec 400. Illustrated modules include a video codec 428, camera control 430, framing 432, other video processing 434, audio codec 436, audio processing 438, network operations 440, user interface 442 and operating system, and various other modules 444. In some examples, a power controlling module, a pre-recording module, a speech detection module, and/or an output-controlling module, as discussed above, are included with the modules included in the flash memory 418 and can be executed by the processing unit 414. Furthermore, in some examples, machine readable instructions can be stored in the flash memory 418 that cause the processing unit 414 to carry out steps of any of the methods 100, 300 described above. The RAM 420 is used for storing any of the modules in the flash memory 418 when the module is executing, storing video images of video streams and audio samples of audio streams and can be used for scratchpad operation of the processing unit 414.

The network interface 416 enables communications between the codec 400 and other devices and can be wired, wireless or a combination. In one example, the network interface 416 is connected or coupled to the Internet 446 to communicate with remote endpoints 448 in a videoconference. In one example, the general interface 422 provides data transmission with local devices (not shown) such as a keyboard, mouse, printer, projector, display, exter-nal loudspeakers, additional cameras, and microphone pods, etc.

In one example of this disclosure, the processing unit 414 processes the video and audio from the camera 424 and the microphones 406 using processes in the modules stored in the flash memory 418. Processed audio and video streams can be sent to and received from remote devices coupled to network interface 416 and devices coupled to general interface 422. Microphones in a microphone array used for speech recognition can be used as the microphones providing speech to the far site, or separate microphones, such as microphone 406, can be used.

Certain operations of methods according to the technology, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular examples of the technology. Further, in some examples, certain operations can be executed in parallel, including by dedicated parallel processing devices, or separate computing devices that interoperate as part of a large system.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in one example, the electronic based aspects of the disclosed technology can be implemented in software (for example, stored on non-transitory computer-readable medium) executable by a processor. Although certain drawings illustrate hardware and software located within particular devices, these depictions are for illustrative purposes. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by a network or other suitable communication links.

Any suitable non-transitory computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this disclosure, a computer-usable or computer-readable medium may be any medium that can contain, store, communicate, or transport the program for use by or in connection with the instruction execution system, apparatus, or device.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. Components (or system, module, and so on) can reside within a process or thread of execution, can be localized on one computer, can be distributed between two or more computers or other processor devices, or can be included within another component (or system, module, and so on).

We claim:

1. A method of processing participant data in a conference, the method comprising:
   recording an audio signal with a microphone associated with a participant of the conference;
   determining if the audio signal includes speech produced by the participant using a speech detection module;
   determining if a time delay exists between when the participant initiates the speech and the determination that the audio signal includes the speech produced by the participant;
   adjusting a first speed of the audio signal to an adjusted first speed if the time delay is determined to exist; and
   outputting the audio signal at the adjusted first speed.

2. The method of claim 1, the method further comprising: automatically unmuting the microphone with a microphone mute-controlling module when the participant joins the conference.

3. The method of claim 1, wherein recording the audio signal includes storing a first segment of the audio signal in a pre-recording buffer, and wherein adjusting the first speed of the audio signal includes accessing the first segment of the audio signal that is stored in the pre-recording buffer.

4. The method of claim 3, wherein adjusting the first speed of the audio signal further includes adjusting the first segment of the audio signal.

5. The method of claim 1, wherein recording the audio signal occurs at a first timestamp, and wherein using the speech detection module occurs at a second timestamp, and wherein determining if the time delay exists includes comparing the first timestamp with the second timestamp to determine if the second timestamp is different than the first timestamp.

6. The method of claim 5, wherein adjusting the first speed of the audio signal includes accelerating the first speed of the audio signal to eliminate the time delay when the second timestamp occurs later than the first timestamp.

7. The method of claim 1, the method further comprising:
   recording a video signal with a webcam;
   determining if an additional time delay exists between the audio signal and the video signal;
   adjusting a second speed of the video signal if the additional time delay is determined to exist; and
   outputting the video signal at the adjusted second speed.

8. The method of claim 1, the method further comprising:
   recording a video signal with a webcam;

adjusting a second speed of the video signal by a factor less than one; and outputting the video signal at the adjusted second speed.

9. A non-transitory computer-readable medium containing instructions that, when executed, cause a processor to:
record an audio signal with a microphone associated with a participant of a conference;
determine if the audio signal includes speech produced by the participant using a speech detection module;
determine if a time delay exists between when the participant initiates the speech and the determination that the audio signal includes the speech produced by the participant;
adjust a first speed of the audio signal to an adjusted first speed if the time delay is determined to exist; and
output the audio signal at the adjusted first speed.

10. The non-transitory computer-readable medium of claim 9, wherein the audio signal includes a first audio segment that is stored in a pre-recording buffer, the first audio segment having a second speed.

11. The non-transitory computer-readable medium of claim 10, wherein the second speed of the first audio segment is adjusted if the time delay is determined to exist.

12. The non-transitory computer-readable medium of claim 9, wherein the processor is to record a first timestamp when the audio signal is recorded and a second timestamp when the audio signal is determined to include the speech produced by the participant.

13. The non-transitory computer-readable medium of claim 12, wherein the first speed of the audio signal is accelerated to eliminate the time delay if the second timestamp occurs later than the first timestamp.

14. The non-transitory computer-readable medium of claim 9, wherein the processor is to record a video signal with a webcam and determine if a time delay exists between the audio signal and the video signal.

15. A system for processing data in a videoconference, the system comprising:
a microphone associated with a participant of the videoconference to record an audio signal;
a camera associated with the participant to record a video signal;
a processor connected to the microphone and the camera; and
a memory coupled to the processor, the memory including:
a pre-recording module to store the audio signal and the video signal;
a speech detection module to determine if the participant is speaking in the videoconference; and
an output-controlling module to adjust at least one of a first speed of the audio signal and a second speed of the video signal if a time delay is determined to exist between the audio signal and the video signal,
wherein the memory stores a first timestamp that is generated when the audio signal is recorded; a second timestamp that is generated when the video signal is recorded; and a third timestamp that is generated when the participant is determined to be speaking in the videoconference.

16. The system of claim 15, wherein the memory further includes a microphone mute controlling module to unmute the microphone.

17. The system of claim 15, wherein the speech detection module applies at least one of an audio speech detection process and an artificial intelligence motion tracking process to determine if the participant is speaking.

18. The system of claim 15, wherein the output-controlling module accelerates the first speed of the audio signal if the third timestamp occurs later than the first timestamp, and wherein the output-controlling module accelerates the second speed of the video signal if the third timestamp occurs later than the second timestamp.

19. The system of claim 15, wherein the output-controlling module accelerates the first speed of the audio signal, deaccelerates the second speed of the video signal, or both to eliminate the time delay between the audio signal and the video signal if the first timestamp occurs later than the second timestamp.

* * * * *